UNITED STATES PATENT OFFICE.

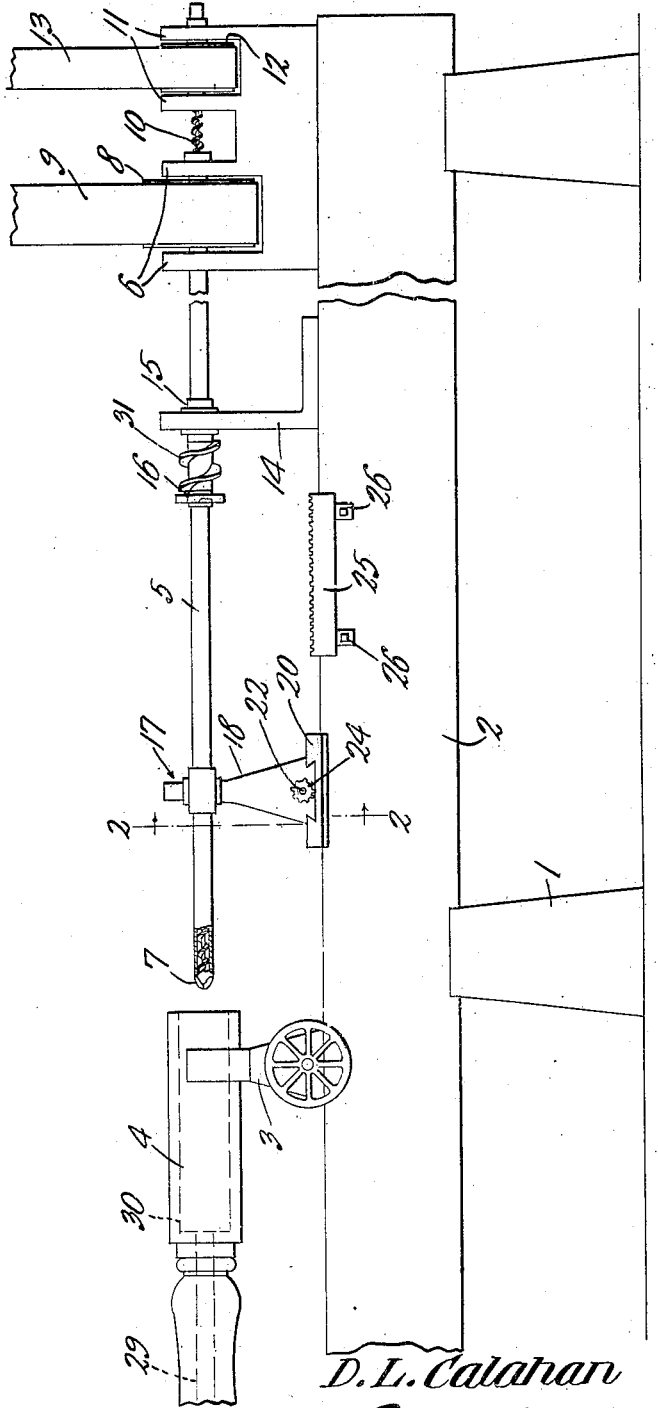

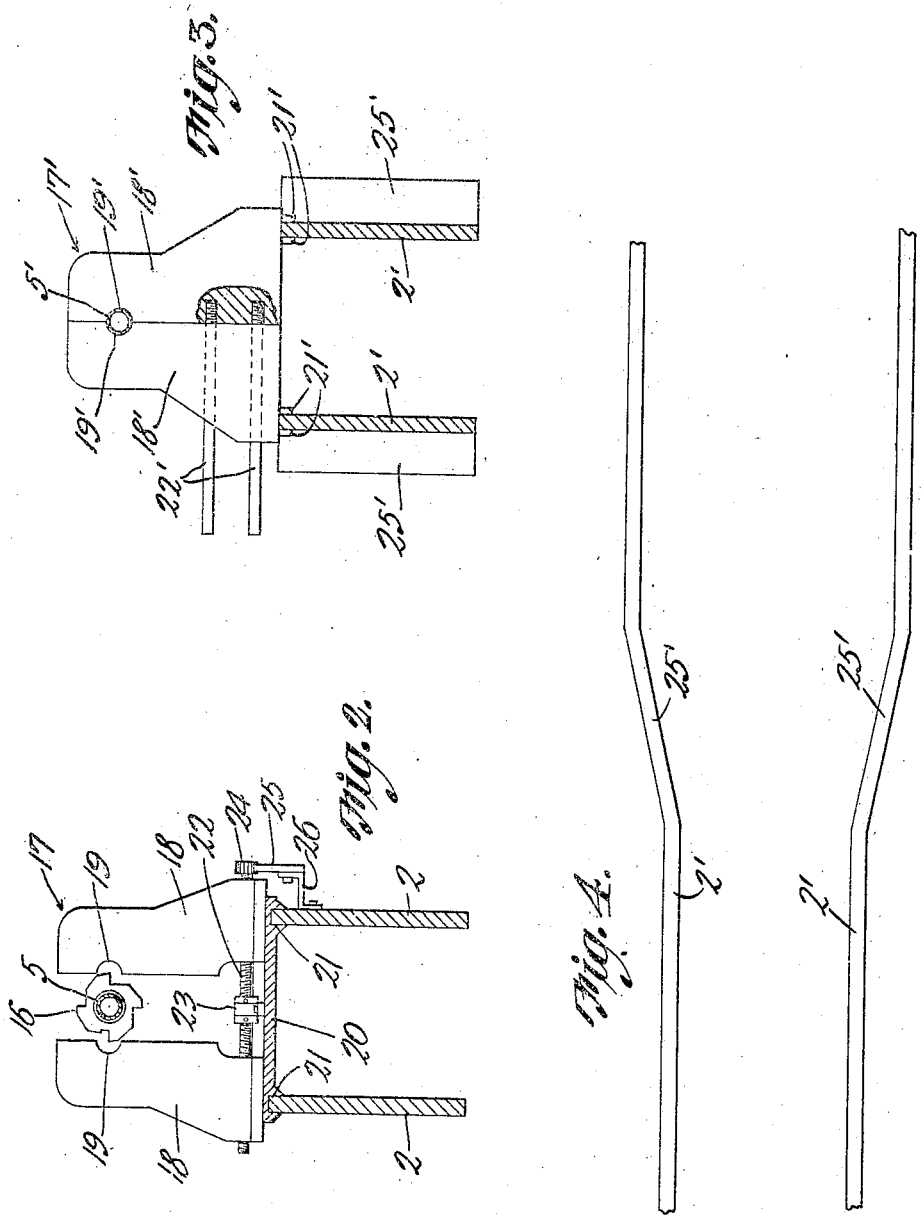

DELONA L. CALAHAN, OF FAIRFAX, WASHINGTON, ASSIGNOR TO MANLEY, MOORE LUMBER COMPANY, OF TACOMA, WASHINGTON.

AUTOMATIC BORING-MACHINE.

1,219,078.   Specification of Letters Patent.   Patented Mar. 13, 1917.

Application filed March 11, 1916. Serial No. 83,583.

*To all whom it may concern:*

Be it known that I, DELONA L. CALAHAN, a citizen of the United States, residing at Fairfax, in the county of Pierce and State of Washington, have invented a new and useful Automatic Boring-Machine, of which the following is a specification.

The present invention appertains to boring machines, and particularly wood boring machines, it being the object of the invention to provide a novel and improved machine for boring out columns, especially, although the machine may be employed for boring out pedestals, balusters, posts and the like.

The object of the invention is the provision of a machine for boring out the column to lengthen or increase the life thereof, and for counterboring or reaming out the wood at one end of the column to leave a relatively thin shell through which the heat of the sun can penetrate for evaporating the moisture within the lower end of the column to thus avoid the decaying of the wood.

The machine embodies a tubular or hollow auger shank having an auger at one end to enter the wood, a reamer carried by said shank at a distance from the auger, and means for supporting the shank near the auger to uphold the shank until the auger has entered the wood sufficiently to support the shank, said means being movable away from the shank to pass said reamer as the stock and reamer come close together.

It is also within the scope of the invention to provide a wood boring machine of the nature indicated which is comparatively simple and inexpensive in construction and which is practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a side elevation of the machine, portions being broken away.

Fig. 2 is an enlarged sectional view on the line 2—2 of Fig. 1.

Fig. 3 is a view similar to Fig. 2 illustrating a modification.

Fig. 4 is a plan view of the track used with the modification.

In carrying out the invention, there is provided a suitable frame 1 having a longitudinal track embodying the rails or guides 2, a carriage 3 being movable along the track and supporting the column or stock 4 which is to be bored. The foregoing parts are only illustrated diagrammatically, since they are well known and need no detailed consideration.

A tubular longitudinal shank 5 is journaled at one end through bearings 6 carried by one end of the frame, and is provided at its other end with an auger 7 to enter the stock 4, said stock and shank 5 being coaxial or in alinement. A pulley wheel 8 is secured upon the shank 5 between the bearings 6 for the connection of a belt 9 for driving the auger shank.

As a means for conveying the sawdust and chips away from the auger 7, a conveyer screw or worm 10 works within the shank 5 and extends from the auger 7 to and out of the remote end of the shank 5, and the shank of the conveyer worm 10 is journaled through bearings 11 adjacent the bearings 6, a pulley wheel 12 being secured upon said shank between the bearings 11 for the connection of a belt 13 for driving the worm 10.

A pedestal 14 is slidable along the track, said pedestal being supported slidably in any suitable manner, and has a bearing 15 slidably embracing the shank 5 to assist in supporting said shank in its horizontal position. A reamer 16 is secured upon the shank 5 ahead of the pedestal 14.

A second pedestal or support 17 is slidable along the track between the auger 7 and reamer 16, and embodies a pair of upright sections or halves 18 provided at their adjacent edges with notches 19 for receiving the shank 5 when said sections 18 are moved together, to thus support the free or outer end of the shank 5. The sections 18 are slidable transversely upon a slide 20 having grooves 21 engaging the upper edges of the rails 2, to guide the slide 20 for longitudinal movement. A double screw 22 is threaded through the lower ends of the sections 18, said screw having right and left hand threads engaging the two sections, whereby when the screw is rotated, the sections 18 will be moved in opposite directions either toward or away from one another. The screw 22 is preferably constrained against longitudinal movement of itself, by suitable means 23 carried by the slide 20.

In order to separate the sections 18 when the pedestal 17 approaches the reamer 16, a pinion 24 is secured to one end of the screw 22, and is adapted to mesh with a rack 25 carried by outstanding brackets 26 attached to one of the rails 2. The pinion 24 is engageable with the rack 25 just before the pedestal 17 reaches the reamer 16, and when the pinion 24 runs over the rack 25, this will rotate the screw 22, so as to separate the sections 18 whereby they are separated sufficiently to pass the reamer 16, as illustrated in Fig. 2.

The slide 20 can either be attached to the stock carriage 3 to be moved longitudinally therewith, which is also true of the pedestal 14, or the slide 20 can be pushed ahead by the carriage 3 after the carriage is brought against the slide 20. The pedestal 14 can either be moved with the carriage 3 or can be pushed ahead by the slide 20.

In operation, the column 4 supported by the carriage 3 is moved lengthwise toward the auger 7, and the auger will enter the wood to provide the bore 29, the sawdust and chips being carried through the tubular or hollow shank 5 by the conveyer worm 10. After the auger 7 and shank 5 have entered the wood, so as to support the free end of the shank 5, the pedestal 17 can be moved with the carriage 3, and as the pedestal 17 approaches the reamer 16, the pinion 24 in being rotated by the rack 25 will rotate the screw 22 to separate the sections 18 so that they can pass the reamer 16 without interference. The stock is then brought to the reamer 16, which reams out or counterbores the stock 4, as at 30. The square lower end portion of the column 4 can thus be reamed out to leave a relatively thin shell, which is of advantage, especially out of doors, to enable the sun's heat to penetrate the shell and heat the interior thereof for preventing decay.

When the parts are returned to normal or initial position, the pinion 24 in passing back over the rack 25 will rotate the screw 22 in the opposite direction for returning the sections 18 to contacting position so that they will again embrace the shank 5 for supporting the same when the shank and stock are separated.

In the modification illustrated in Figs. 3 and 4, the pedestal 17' embodies the sections 18' having the notches 19' for receiving the tubular auger shank 5', and the lower ends of the sections 18' which seat upon the upper edges of the rails 2' are provided with lugs or pins 21' for guiding the sections 18' along the rails, and said rails are provided at suitable points with oblique cam portions 25' diverging from one another. It is also preferable to attach guide rods 22' to one section 18' which slide through the other section for guiding said sections for movement to and from one another, and to hold them in coöperative relation. When the pedestal 17' is moved past the cam portions 25' in approaching the reamer, said cam portions 25' will separate the sections 18' so that they can pass the reamer without interference, and when the pedestal 17' is returned to initial position, the sections thereof will again be brought together by said cam portions 25'.

The operation of the pedestal 17 or 17' is entirely automatic. The boring and counterboring of the column is of advantage for lightening the weight thereof, for preventing the column from checking while drying in a kiln, and for increasing the life of the column.

It is preferable to use a worm 31 upon the shank 5 in back of the reamer 16, to facilitate the removal of the chips from the reamer, and to also enable the reamer to free itself properly.

Having thus described the invention, what is claimed as new is:

1. In a boring machine, an auger shank having an auger at one end, a reamer carried by said shank, a longitudinally movable support for said shank between said auger and reamer embodying separable sections movable away from the shank to pass said reamer, and means for automatically separating said sections when said support approaches said reamer.

2. In a boring machine, a longitudinal shank having an auger at one end, a reamer carried by said shank, a longitudinally movable pedestal for supporting said shank between said auger and reamer and comprising a pair of sections having notched portions for engaging and supporting said shank, and means for automatically separating said sections when said support is moved toward said reamer in order that the sections can pass said reamer without interference.

In testimony that I claim the foregoing as my own, I have hereto affixed my signature in the presence of two witnesses.

DELONA L. CALAHAN.

Witnesses:
W. A. GOUDIE,
E. M. FOSTER.